United States Patent
Yukawa et al.

(10) Patent No.: US 6,852,817 B2
(45) Date of Patent: Feb. 8, 2005

(54) PIGMENT DISPERSING RESIN AND WATER-BASED PIGMENT DISPERSION WHICH CONTAINS THE SAME

(75) Inventors: Yoshiyuki Yukawa, Hiratsuka (JP); Yuko Hoshida, Ogano-machi (JP); Isao Kamimori, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/400,439

(22) Filed: Mar. 28, 2003

(65) Prior Publication Data
US 2003/0236324 A1 Dec. 25, 2003

(30) Foreign Application Priority Data
Mar. 29, 2002 (JP) ........................................ 2002-095506

(51) Int. Cl.$^7$ .............................................. C08F 222/24
(52) U.S. Cl. .................... 526/291; 526/287; 526/307.5; 524/556; 524/560; 524/817; 524/401; 524/431; 524/432; 524/437
(58) Field of Search .............................. 526/287, 307.5, 526/291; 524/556, 560, 817, 401, 431, 432, 437, 413

(56) References Cited

U.S. PATENT DOCUMENTS

| | | |
|---|---|---|
| 5,231,131 A | 7/1993 | Chu et al. |
| 5,349,036 A | 9/1994 | Simpson et al. |
| 5,736,606 A | 4/1998 | Yanagi et al. |
| 6,660,793 B1 * | 12/2003 | McIntyre et al. ........... 524/441 |

FOREIGN PATENT DOCUMENTS

| | | |
|---|---|---|
| EP | 1 167 475 | 1/2002 |
| EP | 1 247 821 | 9/2002 |
| JP | 50-154328 | 12/1975 |
| JP | 01-182304 | 7/1989 |
| JP | 07316240 | 12/1995 |
| JP | 09-255728 | 9/1997 |
| JP | 09-267034 | 10/1997 |
| WO | 02/31010 | 4/2002 |

* cited by examiner

Primary Examiner—Tatyana Zalukaeva
Assistant Examiner—Satya Sastri
(74) Attorney, Agent, or Firm—Wenderoth, Lind & Ponack, L.L.P.

(57) ABSTRACT

This invention provides a pigment dispersing resin which is a copolymer of:
(A) sulfonic group-containing polymerizable unsaturated monomer,
(B) polyoxyalkylene chain-containing nonionic polymerizable unsaturated monomer,
(C) (C-1) (meth)acrylic acid ester type polymerizable monomer having two tertiary alkyl groups per molecule and/or (C-2) (meth)acrylic acid ester type polymerizable monomer having one tertiary alkyl group and one secondary hydroxyl group per molecule, and
(D) other ethylenically unsaturated monomer; and also provides water-based pigment dispersion which comprises said pigment dispersing resin, pigment, aqueous medium and, as circumstances may demand, basic neutralizer and/or dispersing agent as well.

15 Claims, No Drawings

PIGMENT DISPERSING RESIN AND WATER-BASED PIGMENT DISPERSION WHICH CONTAINS THE SAME

This invention relates to a pigment dispersing resin which is suitably used for water-based paint, and to water-based pigment dispersion which contains said pigment dispersing resin and which is especially suitable as water-based top-coating paint for automobile.

As top-coating paint for automotive finish, there have heretofore been used those of solvent-based type in which a base resin (base polymer) component such as acrylic resin, polyester resin or alkyd resin having such functional groups as hydroxyl group and carboxyl group is used together with a curing agent such as amino resin, optionally-blocked polyisocyanate compound and epoxy compound.

For the protection of terrestrial environment, paint of low volatile organic matter content (VOC) has been demanded in these years. In the field of paint for automotive finish, colored base coating paint in particular has high discharge of VOC. It has therefore been strongly required to switch colored base coating paint to water-based type. It is now expected that, in future, solvent-based coating type will be replaced with water-based coating type.

Problems incidental to the switching of colored base coating paint to water-based type are, for example: (1) pigment dispersing resin blended in water-based paint is incompatible with the binder component in water-based paint; (2) pigment dispersing resin or dispersant fails to uniformly disperse the pigment, and invites flocculation or agglomeration of pigment; and (3) pigment dispersing resin or dispersant in the water-based paint composition fails to cure under baking, and invites the degradation of coating film performance.

Pigments which are used for colored base coating paint generally have hydrophobic surfaces, and are difficult to be wetted with water, while pigment dispersing resins which have conventionally been used for solvent-based colored paint have low solubility in water, and are inferior in dispersing stability in aqueous media. Hence, it is important in designing a pigment dispersing resin for water-based paint to secure satisfactory levels of both the wettability of pigment and the dispersing stability of pigment dispersing resin in an aqueous medium.

Low viscosity and low molecular weight of pigment dispersing resin are considered to be advantageous for the wetting property of pigment; and easy formation of steric repelling layer on pigment surfaces or good solubility of pigment dispersing resin in continuous phase (aqueous medium) are considered to be advantageous for dispersing stability. Both the pigment-wetting property and the dispersing stability of pigment dispersing resin are considered to participate in wetting of the pigment surface with the pigment dispersing resin (those having such a group as alkyl-group which forms weak flocculation in aqueous system are effective) and in adsorption onto the pigment, which are attributable to the interaction between hydrophobic part on the pigment surface and that of pigment dispersing resin.

Past development of pigment dispersing resins or assistant for water-based paint or water-based ink has been advanced based on the foregoing viewpoints. For instance, Sho 50 (1975)-154328A-JP proposed the use of a straight chain anionic polymer containing acidic functional groups which is obtained through polymerization of a monomer mixture containing as a part of its monomer components an acidic functional group-containing, polymerizable unsaturated monomer such as (meth)acrylic acid, as the pigment dispersing resin. Said polymer, however, exhibits high solubility in aqueous media and hence is unsatisfactory in respect of dispersion stability of pigment dispersions. Furthermore, pigment dispersions formed with the use of said polymer show excessively high viscosity and are subject to a drawback of difficult handling.

Hei 1 (1989)-182304A1-JP, Hei 7 (1995)-316240A1-JP and Japanese PCT Public Announcement Hei 10 (1998)-502097A1-JP disclosed, as the pigment dispersing resin, a graft copolymer obtained through copolymerization of carboxyl-containing macromonomers. Said graft copolymer excels in pigment dispersing stability because its trunk portion is hydrophobic and the branch portion is hydrophilic whereas pigment dispersions formed with the use of said copolymer show high viscosity, and the graft copolymer is far from being satisfactory in view of the increasing demand for pigment dispersions having high pigment concentration to save cost and to reduce VOC.

Hei 9 (1997)-255728A1-JP, Hei 9 (1997)-267034A1-JP and Hei 8 (1996)-19201B1-JP disclose an idea of using, as pigment dispersing agent, a nonionic surfactant having polyoxyalkylene chain. Although capable of existing stably in water-based pigment dispersions, said surfactant is unsatisfactory in adsorption to pigment, and is in particular poor in let-down stability, and, moreover, inferior in the appearance of resultant coating film.

On the other hand, top-coating paint for automotive finish are now required to have not only film performance such as high durability, acid resistance, washability (scratch resistance) and chipping resistance, but also still better appearance of coating film in distinctness-of-image gloss, transparency, color development, and the like, than before.

In order to meet the above-mentioned requirements, inventors of this invention have previously proposed pigment dispersing resins which are a copolymer of ionic functional group-containing polymerizable unsaturated monomer and polyoxyalkylene chain-containing nonionic polymerizable unsaturated monomer as copolymeric components (WO 02/31010 pamphlet, EP 1247821, etc.). The use of said pigment dispersing resins provides, even at high pigment concentration, water-based pigment dispersions which have low viscosity and excellent color developing property and which give a coating film with good appearance. When, however, inorganic pigment such as titanium oxide is to be dispersed, even the use of the above-mentioned pigment dispersing resins sometimes causes inconveniences with regard to coating film appearance, weatherability and the like.

An object of the present invention is to provide pigment dispersing resins which excel in wetting property and dispersing stability even at high pigment concentration, and which can provide water-based pigment dispersions having low viscosity, excellent in color developing property and giving a coating film with good appearance.

A further object of the present invention is to provide a water-based pigment dispersion which is in particular suitable for the dispersion of inorganic pigment such as titanium oxide, and which has low viscosity and excellent color-developing property.

Another object of the invention is to provide a water-based paint which excels in curability and which is capable of forming a painted film of splendid finish appearance such as color-developing property and gloss.

Other objects and characteristics of the invention will become apparent from the following descriptions.

After assiduous study to achieve the above-mentioned objectives, the inventors of this invention have found out that a copolymer which is obtained by copolymerizing a monomer having a sulfonic group, a nonionic hydrophilic monomer having polyoxyethylene chain and the like, a monomer having a specific branched chain and other ethylenically unsaturated monomers in the presence of a radical polymerization initiator is quite suitable as a pigment dispersing resin for water-based paint, and thus have completed this invention.

This invention provides a pigment dispersing resin which is characteristically a copolymer of:

(A) sulfonic group-containing polymerizable unsaturated monomer;

(B) polyoxyalkylene chain-containing nonionic polymerizable unsaturated monomer;

(C) (C-1) (meth)acrylic acid ester type polymerizable monomer having two tertiary alkyl groups per molecule and/or (C-2) (meth)acrylic acid ester type polymerizable monomer having one tertiary alkyl group and one secondary hydroxyl group per molecule; and (D) other ethylenically unsaturated monomer.

This invention also provides a water-based pigment dispersion which comprises the above-mentioned pigment dispersing resin, pigment, aqueous medium and, if necessary, a basic neutralizer and/or a dispersing agent as well.

This invention further provides a water-based paint composition which comprises the above-mentioned water-based pigment dispersion.

The following is a further detailed explanation about this invention.

Pigment Dispersing Resin

Pigment dispersing resin which is provided by this invention is a copolymer of (A) sulfonic group-containing polymerizable unsaturated monomer, (B) polyoxyalkylene chain-containing nonionic polymerizable unsaturated monomer, (C) a monomer having specific branched chains, and (D) other ethylenically unsaturated monomer, as follows.

(A) Sulfonic Group-Containing Polymerizable Unsaturated Monomer

Monomer (A) is a monomeric component by which to introduce a sulfonic group as an ionic functional group into a pigment dispersing resin. Concrete examples of this monomer (A) include (meth)acrylamide alkane sulfonic acid such as 2-acrylamide-2-methylpropane sulfonic acid; and sulfoalkyl (meth)acrylate such as 2-sulfoethyl methacrylate. These monomers may be used either singly or in combination of two or more. Among the above-mentioned monomers, 2-acrylamide-2-methylpropanesulfonic acid are particularly suitable. Sulfonic group which is introduced into resin by these monomer (A) acts effectively for the dispersion of inorganic pigment.

In this specification, "(meth)acrylate" means acrylate or methacrylate.

(B) Polyoxyalkylene Chain-Containing Nonionic Polymerizable Unsaturated Monomer:

Monomer (B) is a monomeric component which gives hydrophilicity to the formed copolymer, and which contains polyoxyalkylene chain and polymerizable unsaturated monomer in molecule. Examples of said polyoxyalkylene chain include polyoxyethylene chain, polyoxypropylene chain and polyoxyethylene-polyoxypropylene block chain.

Polyoxyalkylene chain has preferably a molecular weight in a range of 200 to 3,000, desirably 300 to 2,500.

Typical example of monomer (B) is represented by compounds of the following formula (1):

$$CH_2=C(R^3)COO(C_nH_{2n}O)_m-R^4 \quad (1)$$

in which $R^3$ stands for hydrogen or $CH_3$, $R^4$ stands for hydrogen or $C_1-C_4$ alkyl group, m is an integer of 4–60, in particular 6–50, and n is an integer of 2 or 3, preferably 2, and oxyalkylene units $(C_nH_{2n}O)$ in the number of m may be the same or different from each other.

Specific examples of such monomer (B) are as follows: tetraethylene glycol (meth)acrylate, methoxytetraethylene glycol (meth)acrylate, ethoxytetraethylene glycol (meth)acrylate, n-butoxytetraethylene glycol (meth)acrylate, tetrapropylene glycol (meth)acrylate, methoxytetrapropylene glycol (meth)acrylate, ethoxytetrapropylene glycol (meth)acrylate, n-butoxytetrapropylene glycol (meth)acrylate, polyethylene glycol (meth)acrylate, polypropylene glycol (meth)acrylate, methoxypolyethylene glycol (meth)acrylate and ethoxypolyethylene glycol (meth)acrylate, which may be used either singly or in combination of two or more species. Among the above, polyethylene glycol (meth)acrylate and polypropylene glycol (meth)acrylate are particularly suitable.

(C) Monomer Having Specific Branched Chains

Monomer (C) is a monomeric component by which to introduce tertiary alkyl group such as tert-butyl group into the copolymer of this invention. In this invention, there are used (C-1) (meth)acrylic acid ester type polymerizable monomer having two tertiary alkyl groups per molecule and/or (C-2) (meth)acrylic acid ester type polymerizable monomer having one tertiary alkyl group and one secondary hydroxyl group per molecule.

Concrete examples of monomer (C-1) include a monomer of the following formula (2):

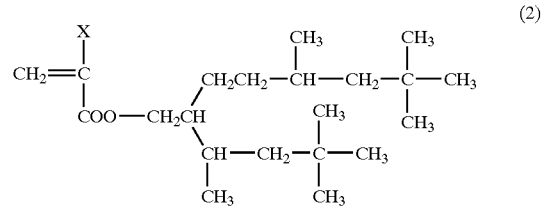

wherein X denotes a hydrogen atom or a methyl group.

Concrete examples of monomer (C-2) include a monomer of the following formula (3):

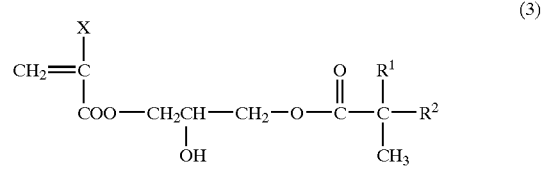

wherein X denotes a hydrogen atom or a methyl group; $R^1$ and $R^2$ each denote a $C_1-C_6$ alkyl group, with the proviso that the total number of carbon atoms of $R^1$ and $R^2$ is 7.

The above-mentioned monomers (C-1) and (C-2) may be used either singly or in combination thereof.

(D) Other Ethylenically Unsaturated Monomer:

Other ethylenically unsaturated monomer (D) is a polymerizable unsaturated monomer other than the above monomers (A), (B) and (C), which is copolymerizable with said monomers (A), (B) and (C), and is suitably selected according to properties required of pigment dispersing resins.

Concrete examples of such monomer (D) include $C_1-C_{24}$ straight chain- or cyclic-alkyl (meth)acrylate monomer such as methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, 2-ethylhexyl (meth)acrylate, n-octyl (meth)acrylate, lauryl (meth)acrylate, stearyl (meth)acrylate, cyclohexyl (meth) acrylate, isobornyl (meth)acrylate and tridecyl (meth) acrylate; hydroxyl group-containing polymerizable unsaturated monomer (typically hydroxyalkyl (meth)acrylate monomer) such as 2-hydroxyethyl (meth)acrylate, hydroxypropyl (meth)acrylate and hydroxybutyl (meth)acrylate; carboxyl group-containing polymerizable unsaturated monomer such as methacrylic acid and acrylic acid; acrylamide and methacrylamide; oxetane ring-containing (meth) acrylates such as 3-ethyl-3-(meth)acryloyloxymethyl oxetane, 3-methyl-3-(meth)acryloyloxymethyl oxetane and 3-butyl-3-(meth)acryloyloxymethyl oxetane; ultraviolet ray-absorbing polymerizable unsaturated monomer such as 2-(2'-hydroxy-5'-methacryloyloxyethylphenyl)-2H-benzotriazole; ultraviolet ray-stable polymerizable unsaturated monomer such as 4-(meth)acryloyloxy-1,2,2,6,6-pentamethylpiperidine; aromatic vinyl compounds such as styrene, α-methyl styrene and vinyl toluene; (meth) acrylonitrile; and vinyl acetate. These polymerizable unsaturated monomers may be used either singly or in combination of two or more.

When used, for example, for the preparation of colored water-based base coating paint, the pigment dispersing resin which is provided by the present invention desirably reacts with curing agent component, e.g., amino resins or optionally-blocked polyisocyanate compounds, to be incorporated into crosslinked paint film, for the sake of favorable paint film performance. Therefore, monomer (D) desirably contains, at least as a part thereof, a hydroxyl group-containing polymerizable unsaturated monomer.

Specific examples of such a hydroxyl group-containing polymerizable unsaturated monomer include monoesters between polyhydric alcohols and (meth)acrylic acid such as 2-hydroxyethyl (meth)acrylate, hydroxypropyl (meth) acrylate, 2,3-dihydroxybutyl (meth)acrylate, 4-hydroxybutyl (meth)acrylate, polyethylene glycol mono (meth)acrylate and the like; and compounds formed by ring-opening polymerization of said monoesters of polyhydric alcohols and (meth)acrylic acid, with ε-caprolactone. In particular, 4-hydroxybutyl (meth)acrylate, polyethylene glycol mono(meth)acrylate [except the above-mentioned monomer (B)] and compounds formed by ring-opening polymerization of said monoesters of polyhydric alcohols and acrylic or methacrylic acid, with ε-caprolactone, show favorable reactivity. The above-recited compounds may be used either singly or in combination of two or more. The hydroxyl group-containing polymerizable unsaturated monomers is desirably used in such an amount that thus obtained copolymer may have a hydroxyl value of 15–75 mgKOH/g, preferably 25–70 mgKOH/g, much desirably 35–60 mgKOH/g.

The pigment dispersing resin of this invention is intended to be used chiefly for aqueous system. With a view to keeping the water dispersibility of said resin, there may be used, in addition to the above-mentioned monomer (B), a carboxyl group-containing polymerizable unsaturated monomer at least as a part of the above-mentioned other ethylenically unsaturated monomer (D), if necessary.

The pigment dispersing resin of this invention is produced by the copolymerization of (A) sulfonic group-containing polymerizable unsaturated monomer, (B) nonionic polymerizable unsaturated monomer, (C) a monomer having specific branched chains, and (D) other ethylenically unsaturated monomer. The proportion of monomers (A), (B), (C) and (D) in copolymerization is not strictly restricted, but may be varied depending on the physical property required of formed copolymer, and the like. Generally, however, the proportion may be set in the following range on the basis of the total weight of monomers (A), (B), (C) and (D):

| | |
|---|---|
| Monomer (A): | 0.1 to 10% by weight, preferably 0.5 to 7% by weight, much more desirably 1 to 4% by weight; |
| Monomer (B): | 5 to 50% by weight, preferably 7.5 to 40% by weight, much more desirably 10 to 30% by weight; |
| Monomer (C): | 1 to 30% by weight, preferably 3 to 25% by weight, much more desirably 5 to 20% by weight; |
| Monomer (D): | 10 to 93.9% by weight, preferably 28 to 89% by weight, much more desirably 46 to 84% by weight. |

The copolymerization of monomers (A), (B), (C) and (D) may be conducted by any known method, for instance, by solution polymerization in an organic solvent, emulsion polymerization in water, or the like, among which solution polymerization is suitable. In an example of copolymerization by solution polymerization, a mixture of the above-mentioned monomers (A), (B), (C) and (D) and a radical polymerization initiator is dissolved or dispersed in an organic solvent, and heated for polymerization at a temperature of about 80° C. to about 200° C. with stirring for 1 to 10 hours.

Examples of organic solvent which is usable for copolymerization include hydrocarbon solvents such as heptane, toluene, xylene, octane and mineral spirit; ester solvents such as ethyl acetate, n-butyl acetate, isobutyl acetate, ethylene glycol monomethylether acetate and diethylene glycol monobutylether acetate; ketone solvents such as methyl ethyl ketone, methyl isobutyl ketone, diisobutyl ketone and cyclohexanone; alcohol solvents such as methanol, ethanol, isopropanol, n-butanol, sec-butanol and isobutanol; ether solvents such as n-butyl ether, dioxane, ethylene glycol monomethyl ether, ethylene glycol monobutyl ether, propyleneglycol monomethylether, propyleneglycol monopropylether, propyleneglycol monobutylether, dipropyleneglycol monomethylether, dipropyleneglycol monobutylether, tripropyleneglycol monomethylether and the like; and aromatic petroleum solvents such as Swasol™ 310, Swasol™ 1000 and Swasol™ 1500 of Cosmo Oil Co., Ltd. These organic solvents can be used either singly or in combination of two or more. At the time of (co-)polymerization, the organic solvent is normally used in an amount not more than 400 parts by weight based on 100 parts by weight of the total of monomer components to be (co-)polymerized.

Examples of the above-mentioned radical polymerization initiator include organic peroxide polymerization initiators like ketone peroxides such as cyclohexanone peroxide, 3,3,5-trimethylcyclohexanone peroxide and methylcyclohexanone peroxide; peroxyketals such as 1,1-bis(tert-butylperoxy)-3,3,5-trimethylcyclohexane, 1,1-bis(tert-butylperoxy)cyclohexane and n-butyl-4,4-bis(tert-butylperoxy)valerate; hydroperoxides such as cumene hydroperoxide and 2,5-dimethylhexane-2,5-dihydroperoxide; dialkylperoxides such as 1,3-bis(tert-butylperoxy-m-isopropyl)benzene, 2,5-dimethyl-2,5-di(tert-butylperoxy)hexane, diisopropylbenzene peroxide and tert-butylcumyl peroxide; diacyl peroxides such as decanoyl peroxide, lauroyl peroxide, benzoyl peroxide and 2,4-dichlorobenzoyl peroxide; peroxycarbonates such as bis (tert-butylcyclohexyl)peroxydicarbonate; and peroxy esters such as tert-butylperoxybenzoate and 2,5-dimethyl-2,5-di (benzoylperoxy)hexane; and azo polymerization initiators like 2,2'-azobisisobutyronitrile, 1,1-azobis(cyclohexane-1-carbonitrile), azocumene-2,2'-azobismethylvaleronitrile and 4,4'-azobis(4-cyanovalerianic acid). The use rate of these polymerization initiators is not critical. Normally, however, it is desirably within a range of 0.1 to 15 parts by weight, in particular 0.3 to 10 parts by weight, per 100 parts by weight of the total of the monomers to be copolymerized.

In the above-mentioned polymerization reaction, the method of addition of the monomeric components or the polymerization initiator is not critical. The polymerization initiator is, however, conveniently added dropwise plural times by portions over the time spun from the initial stage of polymerization to the advanced stage, rather than added in a lump sum at the initial stage, for the sake of effective temperature control during the polymerization reaction and of the prevention of the formation of undesirable cross-linked product such as gel from formed.

The molecular weight of thus produced copolymer is not in particular restricted. Preferably, however, the weight average molecular weight of copolymer is within a range of 500 to 100,000, in particular 1,000 to 70,000, especially 3,000 to 50,000, from a viewpoint of aqueous dispersion stability, pigment dispersibility, viscosity, VOC and color number (degree of pigmentation).

In general, said copolymer has preferably a hydroxyl value of 15–75 mgKOH/g, preferably 25–70 mgKOH/g, much desirably 35–60 mgKOH/g, and an acid value of 3–100 mgKOH/g, preferably 5–70 mgKOH/g, much desirably 10–40 mgKOH/g.

The pigment dispersing resin of this invention which comprises copolymer produced in the afore-mentioned manner is used for the preparation of water-based pigment dispersion. The pigment dispersion resin is therefore required to have both wettability with regard to pigment and pigment dispersion stability. Monomer (A) component which constitutes the pigment dispersing resin of this invention is capable of improving the adsorption of pigment dispersing resin to pigment, and thus acts advantageously for the improvement both in wettability with regard to inorganic pigment such as titanium oxide and in the dispersion stability of resin. Monomer (B) component which constitutes the pigment dispersing resin of this invention contributes to the improvement of pigment dispersing resin in the solubility in continuous phase (aqueous medium), and acts advantageously in particular for the improvement of pigment dispersing resin in dispersion stability. Furthermore, monomer (C) component which constitutes the pigment dispersing resin of this invention remarkably improves appearance such as gloss of paint film of water-based paint which is obtained by use of the pigment dispersing resin.

Hence, the pigment dispersing resin of this invention is quite useful for the preparation of water-based pigment dispersion together with pigment and aqueous medium.

Water-based Pigment Dispersion

The water-based pigment dispersion of this invention can be prepared by blending, with the afore-mentioned pigment dispersing resin of the invention, pigment, aqueous medium and, as circumstances may demand, other pigment dispersing resins, dispersing agent, basic neutralizer and other additives as well.

Examples of pigment include: bright pigments such as aluminum powder, copper powder, nickel powder, stainless steel powder, chromium powder, micaceous iron oxide, titanium dioxide-coated mica powder, iron oxide-coated mica powder and bright graphite; organic red pigments such as Pink EB, azo- and quinacridone-derived pigments; organic blue pigments such as cyanin blue and cyanin green; organic yellow pigments such as benzimidazolone-, isoindolin- and quinophthalone-derived pigments; inorganic colored pigments such as titanium oxide, titanium yellow, iron red, carbon black, chrome yellow, iron oxide and various calcined pigments. Also extender pigment may be included. These pigments may be subjected to any known treatment such as acid-base treatment, coupling agent treatment or oxidation/reduction treatment. Among the above, inorganic pigments such as titanium oxide are preferable.

Blend ratios of these pigments are not subject to specific limitations. Normally, however, they are within a range of 10 to 3,000, preferably 15 to 2,000, inter alia 15 to 1,500 parts by weight, per 100 parts by weight of a pigment dispersing resin of the present invention, in consideration of pigment dispersing ability, dispersion stability and color developing property of resulting pigment dispersions.

Examples of useful aqueous medium include water and water-organic solvent mixtures formed by dissolving organic solvent such as water-soluble organic solvent in water. Useful organic solvent in such mixtures include, for example, water-soluble organic solvents such as methyl alcohol, ethyl alcohol, isopropyl alcohol, propyleneglycol monopropylether, ethylene glycol monobutyl ether, propyleneglycol monomethylether, propyleneglycol monobutylether, dipropyleneglycol monomethylether, dipropyleneglycol monobutylether, tripropyleneglycol monomethylether and 3-methyl-3-methoxybutanol; and water-hardly-soluble or water-insoluble organic solvents such as xylene, toluene, cyclohexanone, hexane and pentane. These organic solvents may be used either singly or as a mixture of two or more. Organic solvent is preferably composed chiefly of water-soluble organic solvent. The mixing ratio of water and organic solvent is not critical. It is desirable, however, that the organic solvent content of the mixture does not exceed 50%, in particular 35%, by weight. The blend ratio of the aqueous medium is not critical. It is desirable, however, that the ratio is within a range of 50 to 5,000, preferably 100 to 3,000, inter alia 100 to 2,000, parts by weight per 100 parts by weight of a pigment dispersing resin or resins in respect of viscosity in the occasion of dispersing the pigment, pigment dispersing ability, dispersion stability and production efficiency.

Examples of other pigment dispersing resins which are used where necessary include acrylic resin which is produced by the copolymerization of carboxylic group-containing polymerizable unsaturated monomer such as (meth)acrylic acid with hydroxyl group-containing polymerizable unsaturated monomer such as 2-hydroxyethyl (meth) acrylate and other polymerizable unsaturated monomer in the presence of radical polymerization initiator. Such an acrylic resin preferably has a weight average molecular weight within a range of about 2,000 to 150,000, in particular 5,000 to 100,000, and an acid value in a range of 5 to 150, especially 15 to 100, and a hydroxyl value in a range of 10 to 160, in particular 30 to 120.

As for the proportion (of solids content) of the pigment dispersing resin (I) of this invention and other pigment dispersing resin (II), resin (II) is suitably used in an amount of 5 to 300 parts by weight, in particular 20 to 150 parts by weight, per 100 parts by weight of resin (I).

When pigment dispersing resins have carboxyl groups, basic neutralizer is used to neutralize the carboxyl groups and to make said other pigment dispersing resins water-soluble or water-dispersible. Specific examples of such a basic neutralizer include inorganic bases such as ammonium hydroxide, sodium hydroxide and potassium hydroxide; and amines such as aminomethyl propanol, aminoethylpropanol, dimethylethanolamine, triethylamine, diethylethanolamine, dimethylaminopropanol and aminomethylpropanol. Such a basic neutralizer should be used at least in a rate sufficient to render said pigment dispersing resins water-soluble or water-dispersible. Normally, therefore, basic neutralizer is used at such a rate as to make the neutralization equivalent of carboxyl group in said pigment dispersing resins 0.3–1.5, preferably 0.4–1.3.

As examples of dispersing agent to be used where necessary, Disperbyk™ 184 or 190 (BYK-Chemie Co.) may be named. Other usable additives include anti-foaming agent, antiseptic, rust-proofing agent and plasticizing agent. It is desirable that blend ratio of any of these additives does not exceed 50 parts by weight per 100 parts by weight of the pigment dispersing resin of the present invention in respect of pigment dispersing ability of the resin, stability of the pigment paste, let-down stability or coating film performance.

Water-based pigment dispersions can be formulated by homogeneously mixing and dispersing the above-described components with a dispersing machine such as paint shaker, sand mill, ball mill, LMZ mill, DCP pearl mill and the like.

Water-Based Paint Compositions

Thus prepared water-based pigment dispersion can be blended with binder resin for paint and suitably with other additives such as aqueous medium, fine polymer particles, curing catalyst, basic neutralizer, ultraviolet absorber, ultraviolet stabilizer, paint film surface regulating agent, antioxidant, flow property regulator, silane coupling agent and the like, and stably dispersed in aqueous medium to provide a water-based paint composition.

Useful paint binder resins include combination of base resins which are normally used in the field of water-soluble or water-dispersible paint, with curing agent. Examples of such base resin include hydroxyl group-containing acrylic resin, hydroxyl group-containing polyester resin, epoxy group-containing copolymer resin and carboxyl group-containing high acid value resin. As examples of useful curing agent, amino resins and optionally-blocked polyisocyanate compounds can be named, which can be used either singly or in combination.

As said hydroxyl group-containing acrylic resin, copolymers having a weight-average molecular weight within a range of from about 2,000 to about 100,000, in particular, from 5,000 to 50,000, which are obtained by copolymerization of a hydroxyl group-containing polymerizable unsaturated monomer such as 2-hydroxyethyl (meth)acrylate with other polymerizable unsaturated monomer or monomers in the presence of a radical polymerization initiator are preferred.

As hydroxyl group-containing polyester resin, those having a weight-average molecular weight within a range of from about 1,000 to 100,000, in particular, from 1,500 to 70,000, which are obtained by condensation reaction between polyhydric alcohols such as ethylene glycol, butylene glycol, 1,6-hexanediol, trimethylolpropane and pentaerythritol, and polyvalent carboxylic acids such as adipic acid, isophthalic acid, terephthalic acid, phthalic anhydride, hexahydrophthalic anhydride and trimellitic anhydride are preferred.

As amino resins which are used as curing agent, melamine resins are used in general. In particular, methylolmelamine resins and melamine resins whose methylol groups have at least partially been etherified with $C_1$–$C_4$ monohydric alcohols are suitable. While water-soluble or water-dispersible melamine resins are preferred, water-insoluble ones can also be used.

As commercially available melamine resins useful for the above purpose, the following may be named for example: butyl etherified melamine resins such as U-Van™ 20SE-60 and 225 (Mitsui Chemicals, Inc.), Super Beckamine™ G840 and G821 (Dainippon Ink & Chemicals, Inc.); methyl etherified melamine resins such as Sumimal™ M-100, M-40S and M-55 (Sumitomo Chemical Co., Ltd.), Cymel™ 303, 325, 327, 350 and 370 (Mitsui Cytec Co., Ltd.), Nikalac ™ MS17 and MS15 (Sanwa Chemical Co., Ltd.) and Resimine™ 741 (Monsanto Co.); methyl- and iso-butyl-mixed etherified melamine resins such as Cymel™ 235, 202, 238, 254, 272 and 1130 (Mitsui Cytec Co., Ltd.), and Sumimal™ M66B (Sumitomo Chemical Co., Ltd.); and methyl- and n-butyl-mixed etherified melamine resins such as Cymel™ XV805 (Mitsui Cytec Co., Ltd.) and Nikalac™ MS95 (Sanwa Chemical Co., Ltd.).

Said optionally-blocked polyisocyanate compounds usable as the curing agent include both of polyisocyanate compounds having free isocyanate groups and those in which isocyanate groups are blocked.

Examples of polyisocyanate compounds having free isocyanate groups include organic polyisocyanates per se, e.g., aliphatic diisocyanates such as hexamethylenediisocyanate and trimethylhexamethylenediisocyanate; cycloaliphatic diisocyanates such as hydrogenated xylylenediisocyanate and isophoronediisocyanate; aromatic diisocyanates such as tolylenediisocyanate and 4,4'-diphenylmethanediisocyanate; and polyisocyanate compounds having not less than 3 isocyanate groups such as triphenylmethane-4,4',4"-triisocyanate, 1,3,5-triisocyanatobenzene, 2,4,6-triisocyanatotoluene and 4,4'-dimethyldiphenylmethane-2, 2',5,5'-tetraisocyanate. These organic polyisocyanates may be used in such forms as adducts with polyhydric alcohol, low molecular weight polyester resin, water or the like; or cyclized polymers composed of these organic polyisocyanates, or isocyanate biuret.

As commercially available polyisocyanate compounds having free isocyanate groups, for example, Burnock™ D-750, -800, DN-950, DN-970 and DN-15-455 (Dainippon Ink & Chemicals, Inc.); Desmodur™ L, N, HL and N3390 (Sumitomo Bayer Urethane Co., Ltd.); Takenate™ D-102, -202, -110 and -123N (Takeda Chemical Industries, Ltd.); Coronate™ EH, L, HL and 203 (Nippon Polyurethane Industry Co., Ltd.); and Duranate™ 24A-90CX (Asahi Chemical Industry Co., Ltd.) may be named.

As polyisocyanate compounds in which isocyanate groups are blocked, those formed by blocking isocyanate groups in the above-described polyisocyanate compounds having free isocyanate groups, with a known blocking agent such as oxime, phenol, alcohol, lactam, malonic acid ester or mercaptane can be used. Typical commercially available polyisocyanate compounds whose isocyanate groups are blocked include Burnock™ D-550 (Dainippon Ink & Chemicals, Inc.), Takenate™ B-815-N (Takeda Chemical Industries, Ltd.), Additol™ VXL-80 (Hoechst AG, Germany), Coronate™ 2507 (Nippon Polyurethane Industry Co., Ltd.) and Desmodur™ N3500 (Sumitomo Bayer Urethane Co., Ltd.).

The aqueous medium which is used when necessity arises can be suitably selected from those useful for preparing the pigment dispersions as earlier explained.

The fine polymer particles are provided by a polymer which does not dissolve in paint compositions of the present invention but disperses as fine particles. Suitable average particle size normally is within a range of 0.01–1 $\mu$m, preferably 0.05–0.8 $\mu$m. Inside of the particles may either be crosslinked or not, the former being preferred. As such fine polymer particles, those known per se as flow property regulator in the field of paint can be used.

Where an optionally-blocked polyisocyanate compound is used as the curing agent, organometal catalysts such as dibutyltin diacetate, dibutyltin dioctate, dibutyltin dilaurate and the like; and amines such as triethylamine, diethanolamine and the like can be conveniently used as the curing catalyst. When an amino resin such as melamine resin is used as the curing agent, such curing catalyst as sulfonic acid compound, e.g., paratoluenesulfonic acid, dodecylbenzensulfonic acid and dinonylnaphthalenesulfonic acid; or amine-neutralization products of these sulfonic acid compounds are conveniently used.

As examples of ultraviolet absorber, benzophenone, benzotriazole, cyanoacrylate, salicylate and oxalic acid anilide compounds may be named. As the ultraviolet stabilizer, hindered amine compounds can be used.

The water-based paint compositions according to the invention are useful as coloring paint compositions (including metallic paint and iridescent paint) into which various pigments such as coloring pigments, metallic pigments and iridescent pigments are blended. In particular, they can be conveniently used as top coating paint (coloring base coat) for automotive finish.

The paint compositions according to the invention can be applied onto various substrate, following the practice known per se, and can form cured coating film when baked normally at temperatures of from about 80° C. to about 180° C., for about 10–60 minutes. Where a short time baking is desired, for example, a cured coating film can be formed by baking under such conditions as will attain the highest temperature of from about 180° C. to about 250° C. of the material being baked, for about 20 to about 60 seconds.

Substrate to be coated with the paint compositions of the present invention are subject to no specific limitation, examples of which include metallic substrate such as steel sheet, aluminum, tin and the like; other substrate such as of mortar, cement, plastics, glass and the like; and these substrates which have been subjected to surface treatment and/or coating film formation. In particular, metallic substrates and plastic substrates are suitable for use.

Examples of steel sheet include cold-rolled steel sheet, molten galvanized steel sheet, electrogalvanized steel sheet, aluminum plated steel sheet, stainless steel sheet, copper plated steel sheet, tin plated steel sheet, lead-tin alloy plated steel sheet (ternesheet); steel sheet plated with zinc alloy such as iron-zinc, aluminum-zinc, nickel-zinc alloys and the like. As surface-treated steel sheet, for example, steel sheet which is given a chemical treatment such as phosphate treatment, chromate treatment and the like may be named.

As the substrate on which coating film has been formed, a substrate which has been optionally surface treated and thereafter primer-coated, or said substrate which is further coated with an inter-coat can be used.

When a paint composition according to the present invention is used for automotive finish, typical substrates include: a chemically treated steel sheet which is further electrodeposition-coated with primer and optionally coated with an inter coat thereon; various plastic substrates (which have been optionally surface treated, primer-coated or further coated with an inter coat); and composite members which are combination of the foregoing.

Paint for the above-mentioned electrodeposition coating may be anionic or cationic, cationic type being preferred because of good corrosion resistance. As cationic electrodeposition paint, any of those known per se can be used. For example, those containing as the resin component a base resin having hydroxyl groups and cationic groups and as the curing agent a blocked polyisocyanate compound can be conveniently used.

The water-based paint compositions according to the present invention are conveniently used for colored coating film-forming compositions for 1-coat-1-bake finish of substrates, and for top coating colored base paint compositions in 2-coat-1-bake (2C1B), 2-coat-2-bake (2C2B), 3-coat-1-bake (3C1B), 3-coat-2-bake (3C2B), or 3-coat-3-bake (3C3B) systems.

Where the paint compositions according to the present invention are used for colored top coating for automobiles, the top coat can be formed through the steps of, applying the paint composition onto a primer film such as an electrodeposited coating film or onto an uncured or cured inter coat applied onto such a primer film, by such means as electrostatic atomizing coating (bell-type or the like) or aerosol coating, to a dry film thickness of normally from about 10 to about 60 $\mu$m; and allowing it to stand for several minutes at room temperature, or forcedly drying the film for several minutes at temperatures ranging from about 50 to about 80° C.; or baking the same at temperatures of from about 120 to about 180° C. normally for about 10 to about 60 minutes. It is also possible to apply a clear top coating paint onto the uncured or cured colored top coat film, by such means as electrostatic atomizing coating (bell-type or the like) or aerosol coating, to a dry film thickness of normally from about 20 to about 100 $\mu$m followed by curing, to form multi-layered top coating film.

As such clear top coating paint to be applied onto the above-described colored top coat, those conveniently used are clear top coating paints comprising at least one base resin having a crosslinkable functional group (e.g., hydroxyl, epoxy, carboxyl, alkoxysilane group and the like) such as acrylic, vinyl, polyester, alkyd and urethane resins; and at least one crosslinking agent for crosslinking and curing the base resin, such as alkyletherified melamine resin, urea resin, guanamine resin, optionally-blocked polyisocyanate compound, epoxy resin and carboxyl-containing compound. In such clear top coating paint, convenient blend ratio of the base resin and the crosslinking agent is, based on the sum of the two components, normally 50–90% by weight of the base resin component and 10–50% by weight of the crosslinking agent component. The form of such clear top coating paint is subject to no specific limitation, and it can take any desired form such as organic solvent type, non-aqueous liquid dispersion type, aqueous solution type, aqueous dispersion (slurry) type, high solid type or powder type.

Hereinafter the invention is explained in further details, referring to production examples, working examples and comparative examples, in which parts and percentages are by weight unless otherwise specified.

Preparation of Pigment Dispersing Resins

EXAMPLE 1

An ordinary reaction vessel for producing acrylic resins, equipped with a stirrer, thermometer and a reflux condenser was charged with 38 parts of ethylene glycol monobutyl ether and 12 parts of isobutyl alcohol. The content in the vessel was heated under stirring, and maintained at 95° C. Into the system, a mixture of 46 parts of methyl methacrylate, 15 parts of n-butyl acrylate, 10 parts of 2-hydroxyethyl acrylate, 40 parts of NF BISOMER™ S20W (trademark of 50% water-dilute of methoxy polyethylene glycol monomethacrylate having a molecular weight of about 2080, manufactured by Dai-ich Kogyo Seiyaku Co., Ltd.,), 1.5 parts of 2-acrylamide-2-methylpropane sulfonic acid, 7.5 parts of isostearylacrylate (trademark of a product manufactured by Osaka Organic Chemical Industry Ltd., corresponding to monomer (C-1)), 1 part of azobisisobutyronitrile and 5 parts of isobutyl alcohol was added dropwise over a period of 3 hours, followed by 30 minutes' aging at 95° C. Then an additional catalytic liquid mixture of 20 parts of ethylene glycol monobutyl ether and 0.5 part of azobisisobutyronitrile was added dropwise over a period of 1 hour, followed by an hour's aging at 95° C. and cooling. Thus a pigment dispersing resin (A-1) solution having a solids content of 50% was obtained.

EXAMPLES 2–5 AND COMPARATIVE EXAMPLES 1 AND 2

Example 1 was repeated except that the formulation of the used components was varied for each run as shown in the following Table 1, to provide solutions of pigment dispersing resins (A-2) to (A-5) and solutions of pigment dispersing resins (AC-1) and (AC-2) for comparison. The solids contents of these solutions of pigment dispersing resins, and resin acid values of these pigment dispersing resins are as shown in Table 1. Incidentally, (Note 1) in Table 1 below means as follows. In Table 1, the amount of NF BISOMER™ S20W means solids content.

(Note 1) ACRIT M-201: trademark of a product manufactured by Taisei Kako Co., Ltd., corresponding to monomer (C-2)

TABLE 1

|  |  | Examples |  |  |  |  | Comparative Examples |  |
|---|---|---|---|---|---|---|---|---|
|  |  | 1 | 2 | 3 | 4 | 5 | 1 | 2 |
|  | Solution of pigment dispersing resin | A-1 | A-2 | A-3 | A-4 | A-5 | AC-1 | AC-2 |
| Monomeric Composition | Methylmethacrylate | 46 | 46 | 38.5 | 44 | 43.5 | 53.5 | 65 |
|  | n-Butylacrylate | 15 | 15 | 15 | 15 | 15 | 15 | 20 |
|  | 2-Hydroxyethylacrylate | 10 | 10 | 10 | 10 | 10 | 10 | 10 |
|  | 2-Acrylamide-2-methylsulfonic acid | 1.5 | 1.5 | 1.5 | 1.5 | 1.5 | 1.5 |  |
|  | NF BISOMER™ S20W | 20 | 20 | 20 | 20 | 20 | 20 | 5 |
|  | Isostearylacrylate | 7.5 |  | 7.5 | 7.5 |  |  |  |
|  | ACRIT M-201 (Note 1) |  | 7.5 | 7.5 |  | 7.5 |  |  |
|  | 2-(2-Hydroxy-5-methacryloyloxyethylphenyl)-2H-benzotriazole |  |  |  | 2 | 2 |  |  |
|  | 4-Methacryloyloxy-1,2,2,6,6-pentamethyl-piperidine |  |  |  |  | 0.5 |  |  |
| Characteristic value | Solids content (%) | 50 | 50 | 50 | 50 | 50 | 50 | 50 |
|  | Resin acid value (mgKOH/g) | 14 | 14 | 14 | 14 | 14 | 14 | 0 |
|  | Hydroxyl value (mgKOH/g) | 48 | 48 | 48 | 48 | 48 | 48 | 48 |

Preparation of Water-Based Pigment Dispersions

EXAMPLES 6 TO 10 AND COMPARATIVE EXAMPLES 3 AND 4

Pigment dispersing resin solutions which had been synthesized in the above Examples 1 to 5 and Comparative Examples 1 and 2, pigment, deionized water and wetting-dispersing agent at the compositional formulation as shown by Table 2 below were ground with use of a dissolver for 30 minutes, and, thus, water-based pigment dispersions (B-1) to (B-5) and (BC-1) and (BC-2) were prepared. The following are notes for Table 2.

(Note 2) JR903: trademark of inorganic titanium white pigment manufactured by TAYCA Corporation (Note 3) SN-122NSK: trademark of defoamer manufactured by San Nopco Ltd.

(Note 4) BYK-180: trademark of wetting-dispersing agent manufactured by BYK-Chemie Co.

TABLE 2

|  |  | Example |  |  |  |  | Comparative Example |  |
|---|---|---|---|---|---|---|---|---|
|  |  | 6 | 7 | 8 | 9 | 10 | 3 | 4 |
| Water-based pigment dispersion |  | B-1 | B-2 | B-3 | B-4 | B-5 | BC-1 | BC-2 |
| Solution of pigment dispersing resin | Species | A-1 | A-2 | A-3 | A-4 | A-5 | AC-1 | AC-2 |
|  | Amount | 12 | 12 | 12 | 12 | 12 | 12 | 12 |
| Pigment | JR903 (Note 2) | 84.5 | 84.5 | 84.5 | 84.5 | 84.5 | 84.5 | 84.5 |
| Additive | SN-122NSK (Note 3) | 0.3 | 0.3 | 0.3 | 0.3 | 0.3 | 0.3 | 0.3 |
|  | BYK-180 (Note 4) | 1 | 1 | 1 | 1 | 1 | 1 | 1 |
| Deionized water |  | 34 | 34 | 34 | 34 | 34 | 34 | 34 |
| Total |  | 131.8 | 131.8 | 131.8 | 131.8 | 131.8 | 131.8 | 131.8 |

Synthesis of Base Resin for Paint

SYNTHESIS EXAMPLE 1

A reaction vessel equipped with a stirrer, thermometer, rectification column, nitrogen inlet pipe and reflux condenser was charged with 317.8 parts of isophthalic acid, 196.5 parts of hexahydrophthalic acid, 372.6 parts of adipic acid, 268 parts of neopentyl glycol, 217.8 parts of 1,6-hexanediol and 263.5 parts of trimethylolpropane, which were heated under stirring while nitrogen gas was introduced. After the temperature reached 160° C., the system was gradually heated to 235° C. over a period of 3 hours, followed by 1.5 hours' aging. Thereafter the rectification column was switched to reflux condenser, and the reaction was continued after the introduction of 100 parts of toluene, under reflux. The reaction was conducted for 6 hours at 235° C., and thereafter the toluene was removed under reduced pressure. The system was cooled to 170° C., followed by the addition of 122.5 parts of trimellitic anhydride and 30 minutes' aging at 170° C. Furthermore, 322 parts of butyl cellosolve was added, and the system was thereafter cooled to 80° C. Then, 4 parts of N,N-dimethylaminoethanol was added, and the system was allowed to stand at 80° C. for 30 minutes, followed by cooling to 50° C., the addition of 2200 parts of deionized water and 30 minutes' stirring. Thus a polyester resin solution (P-1) having a solid concentration of 45% was obtained.

Production of Water-Based Paint Composition

EXAMPLE 11

There were mixed 131.8 parts of water-based pigment dispersion (B-1) which had been obtained in Example 6, 153.5 parts of polyester resin solution (P-1) which had been obtained in Synthesis Example 1, 37.5 parts of MS-25 (trademark of methyl-n-butyl mixed etherified melamine resin solution manufactured by Sanwa Chemical Co., Ltd.) and 0.83 part of WS-314 (trademark of surface regulator manufactured by Kyoei K.K.), and, furthermore, 0.8 part of dimethylethanol amine and 88 parts of deionized water were added, and, thus, a colored water-based paint composition having a solids content of about 44%, a viscosity of 35 to 40 seconds (Ford cup #4/20° C.) and a pH of about 8.5 was obtained.

EXAMPLES 12 TO 15 AND COMPARATIVE EXAMPLES 5 AND 6

Example 11 was repeated except that the formulation of components was varied for each run as shown in Table 3 which is mentioned later, and, thus, there were obtained colored water-based paint compositions.

Using these colored water-based paint compositions, test panels were prepared by the following method.

Preparation of Test Panels

A 0.8 mm-thick cold rolled dull steel sheet which had been chemically treated with zinc phosphate was coated with an epoxy resin-based cationic electrodeposition paint to a dry film thickness of about 20 µm which was subsequently baked. Onto this electrodeposited paint film, automotive polyester resin-based inter coating paint was applied to a dry film thickness of about 20 µm and baked. This coated steel sheet was wet-sanded with #400 sand paper, dried off and degreased with petroleum benzin. Onto so degreased coat surface, each of the colored paint compositions whose viscosity had been adjusted with deionized water to about 25 seconds (Ford cup #4/20° C.) was applied with air spray, to a dry film thickness of about 35 µm, and allowed to stand at room temperature for about 5 minutes, followed by baking with an electric hot air dryer at 140° C. for 30 minutes, and, thus, test panels were prepared.

Thus prepared test panels were subjected to various performance tests by the following test methods, with the results as given in Table 3 which is mentioned later.

Test Methods (*1) Gloss: With use of Micro-tri-glossmeter (JIS Z 8741), each of coating films was measured for 60° specular gloss.

(*2) HAZE: With use of BYK Microhaze meter (JIS Z 8741), each of coating films was measured for HAZE value. The smaller values are the better.

(*3) Appearance of coat finish: The appearance of coat finish was synthetically examined in respect of gloss and fatness, and evaluated according to the following criteria:

◯: good;

Δ: poor;

X: very poor.

(*4) Weatherability: Test panels were subjected to accelerated weatherability test in accordance with JIS K 5600 7-7 with use of Super Xenon Weathermeter (a weatherometer manufactured by Suga Test Instruments Co., Ltd.) for the retention of 60° gloss after 1500 hours from the start of test. The larger values indicate the better weatherability.

TABLE 3

|  |  | Example | | | | | Comparative Example | |
|---|---|---|---|---|---|---|---|---|
|  |  | 11 | 12 | 13 | 14 | 15 | 5 | 6 |
| Colored water-based paint composition | | C-1 | C-2 | C-3 | C-4 | C-5 | CC-1 | CC-2 |
| Water-based pigment dispersion | Species | B-1 | B-2 | B-3 | B-4 | B-5 | BC-1 | BC-2 |
|  | Amount | 131.8 | 131.8 | 131.8 | 131.8 | 131.8 | 131.8 | 131.8 |
| Polyester polymer solution | P-1 | 153.5 | 153.5 | 153.5 | 153.5 | 153.5 | 153.5 | 153.5 |
| Melamine resin solution | MS-25 | 37.5 | 37.5 | 37.5 | 37.5 | 37.5 | 37.5 | 37.5 |
| Surface regulator | WS-314 | 0.83 | 0.83 | 0.83 | 0.83 | 0.83 | 0.83 | 0.83 |
|  | Dimethylethanol amine | 0.8 | 0.8 | 0.8 | 0.8 | 0.8 | 0.8 | 0.8 |
|  | Deionized water | 88 | 88 | 88 | 88 | 88 | 88 | 88 |
|  | Total | 412.4 | 412.4 | 412.4 | 412.4 | 412.4 | 412.4 | 412.4 |
| Results of evaluation of coating film | Gloss (60°) (*1) | 96 | 97 | 99 | 98 | 96 | 80 | 53 |
|  | HAZE (*2) | 51.1 | 50.1 | 50.2 | 51.5 | 52.3 | 67.2 | 25.0 |
|  | Coating film appearance (*3) | ◯ | ◯ | ◯ | ◯ | ◯ | Δ | X |
|  | Weatherability (*4) | 86 | 83 | 86 | 94 | 94 | 76 | 25 |

Industrial Applicability

The use of the pigment dispersing resins of this invention provides water-based pigment dispersions which excel in wetting property and dispersing stability even at high pigment concentration, and which have low viscosity and are excellent in color developing property. The use of said water-based pigment dispersions in turn gives a coating composition which excels not only in pigment color-developing property and in coating film performance such as coating film appearance, weatherability and physical properties, but also in pigment dispersing stability, and which can be made to contain pigment at a high concentration.

What is claimed is:

1. A pigment dispersing resin which is a copolymer of
   (A) sulfonic group-containing polymerizable unsaturated monomer;
   (B) polyoxyalkylene chain-containing nonionic polymerizable unsaturated monomer;
   (C) (C-1) (meth)acrylic acid ester type polymerizable monomer having two tertiary alkyl groups per molecule and/or (C-2) (meth)acrylic acid ester type polymerizable monomer having one tertiary alkyl group and one secondary hydroxyl group per molecule; and
   (D) other ethylenically unsaturated monomer and
   where the copolymer is obtained by the copolymerization of monomers (A), (B), (C) and (D) at the following proportion on the basis of the total weight of monomers (A), (B), (C) and (D):

Monomer (A): 0.1 to 10% by weight;
Monomer (B): 5 to 50% by weight;
Monomer (C): 1 to 30% by weight; and
Monomer (D): 10 to 93.9% by weight.

2. The pigment dispersing resin of claim 1 wherein sulfonic group-containing polymerizable unsaturated monomer (A) is selected from the group consisting of (meth)acrylamide alkane sulfonic acid and sulfoalkyl (meth)acrylate.

3. The pigment dispersing resin of claim 1 wherein sulfonic group-containing polymerizable unsaturated monomer (A) is 2-acrylamide-2-methylpropane sulfonic acid.

4. The pigment dispersing resin of claim 1 wherein nonionic polymerizable unsaturated monomer (B) is a compound of the following formula (1):

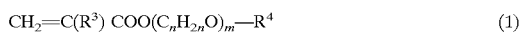

in which $R^3$ stands for hydrogen or $CH_3$, $R^4$ stands for hydrogen or $C_1$–$C_4$ alkyl group, m is an integer of 4–60, and n is an integer of 2 or 3, and oxyalkylene units ($C_nH_{2n}O$) in the number of m may be the same or different from each other.

5. The pigment dispersing resin of claim 1 wherein nonionic polymerizable unsaturated monomer (B) is selected from the group consisting of polyethylene glycol (meth)acrylate and polypropylene glycol (meth)acrylate.

6. The pigment dispersing resin of claim 1 wherein (C-1) (meth)acrylic acid ester type polymerizable monomer having two tertiary alkyl groups per molecule is a monomer of the following formula:

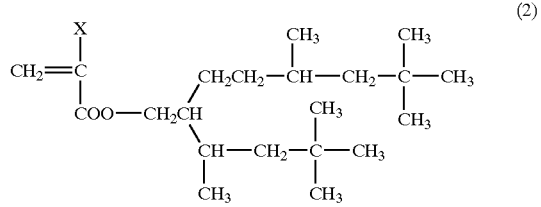

wherein X denotes a hydrogen atom or a methyl group.

7. The pigment dispersing resin of claim 1 wherein (C-2) (meth)acrylic acid ester type polymerizable monomer having one tertiary alkyl group and one secondary hydroxyl group per molecule is a monomer of the following formula:

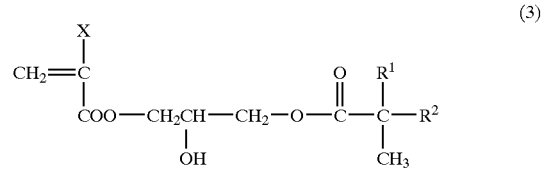

wherein X denotes a hydrogen atom or a methyl group; $R^1$ and $R^2$ each denote a $C_1$–$C_6$ alkyl group, with the proviso that the total number of carbon atoms of $R^1$ and $R^2$ is 7.

8. The pigment dispersing resin of claim 1 wherein other ethylenically unsaturated monomer (D) contains, at least as a part thereof, a hydroxyl group-containing polymerizable unsaturated monomer.

9. The pigment dispersing resin of claim 1 wherein other ethylenically unsaturated monomer (D) contains, at least as a part thereof, a carboxyl group-containing polymerizable unsaturated monomer.

10. The pigment dispersing resin of claim 1 wherein the copolymer has a weight average molecular weight of 500 to 100,000.

11. A pigment dispersing resin of claim 1 wherein the copolymer has a hydroxyl value of 15–75 mgKOH/g.

12. Water-based pigment dispersion which comprises a pigment dispersing resin of claim 1, pigment, aqueous medium and, optionally, basic neutralizer and/or dispersing agent as well.

13. Water-based pigment dispersion of claim 12 wherein pigment is inorganic pigment.

14. Water-based paint composition which comprises water-based pigment dispersion of claim 12.

15. Articles which have been coated with water-based paint composition of claim 14.

* * * * *